Jan. 12, 1937.  C. W. BREED ET AL  2,067,375
SHIMMED RAIL JOINT
Original Filed Jan. 14, 1935  3 Sheets-Sheet 1

INVENTORS
GEORGE R. BURKHARDT
CHARLES W. BREED
BY
ATTY

INVENTORS
GEORGE R. BURKHARDT
CHARLES W. BREED
BY
ATTY

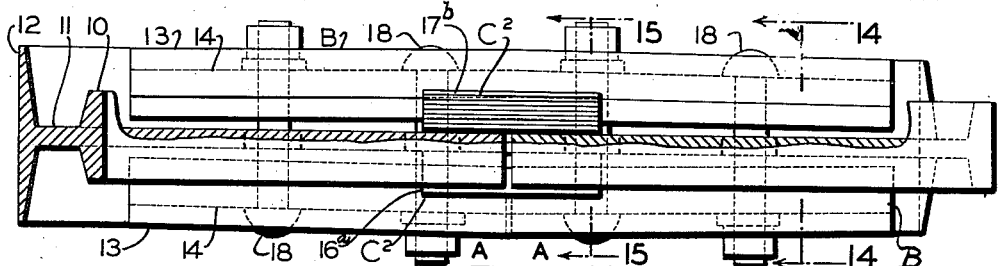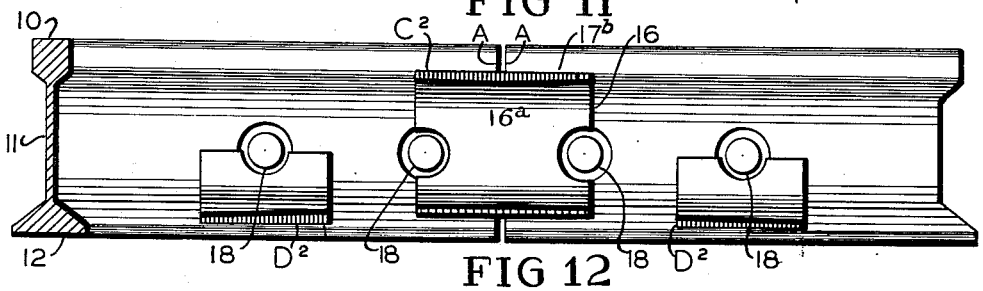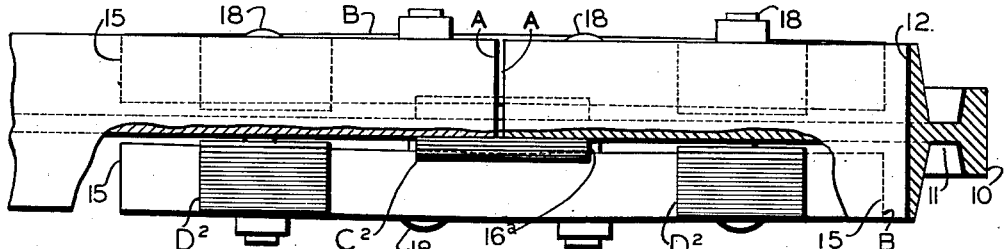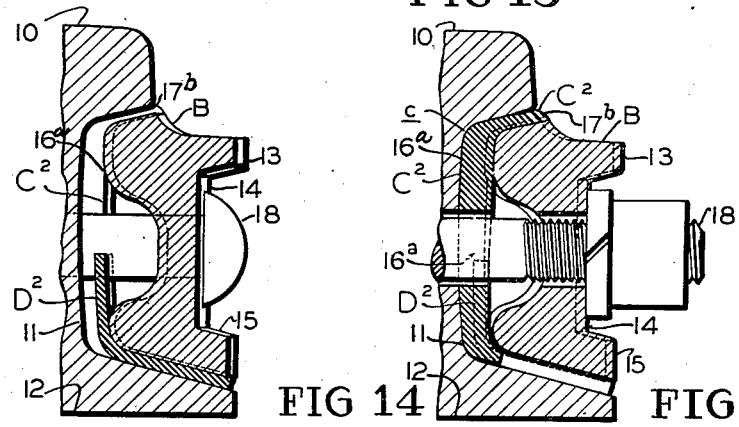

Patented Jan. 12, 1937

2,067,375

UNITED STATES PATENT OFFICE 2,067,375

SHIMMED RAIL JOINT

Charles W. Breed, Western Springs, and
George R. Burkhardt, Chicago, Ill.

Application January 14, 1935, Serial No. 1,790
Renewed August 5, 1936

8 Claims. (Cl. 238—244)

This invention relates to improvements in rail joints, and has generally in view to provide a rail joint which is effective automatically to compensate for wear and to maintain the rail ends high and firmly connected together over relatively long periods of time without requiring manual attention and which, at the same time, is of comparatively low production, installation, maintenance and replacement cost.

It is recognized that maximum wear in a rail joint occurs at the middle of the joint; that is, near the rail ends, and that little or no wear occurs at the ends of the joint. It is recognized, too, that once an ordinary rail joint, embodying rigid splice bars of uniform section and fishing height, becomes medially worn, the practically unworn end portions of the joint are of little or no use in preventing undesirable vertical movement of the extreme end portions of the rails, but act, on the contrary, to prevent the joint from being effectively tightened to compensate for the medial wear. On the other hand it is known that splice bars heretofore have been constructed to permit their medial portions to move inwardly to compensate for wear at the rail ends despite lack of wear at the ends of the bars, but equally well known is the fact that such splice bars require special manufacturing methods and means and are decidedly of high cost. More particularly, therefore, the general object of the present invention is to provide a low cost, shimmed rail joint having the advantages of a wear compensating joint embodying special, efficient splice bars of the general character mentioned.

According to the present invention an upper shim element is interposed between the head of the splice bar and the rails, and includes a vertical portion lying between the webs of the rails and the splice bar, and a lateral portion lying between the under sides of the rail heads and the top of the splice bar. As aforesaid and as is well known, maximum wear in a joint occurs at the under sides of the rail heads near the ends thereof and gradually diminishes towards the ends of the joint. Accordingly, a special object of the present invention is so to shape and form the vertical and lateral portions of the upper shim element that the ends of the same and the ends of the splice bar may be drawn inwardly relative to the medial portions thereof, not only to store energy in the joint to cause the medial portions of the splice bar and the shim to move inwardly to compensate for wear at the middle of the joint as such wear occurs, but to maintain a substantially uniform load sustaining bearing cooperation between the rail heads and the splice bar substantially throughout the length of the joint regardless of the amount and distribution of the wear.

Preferably, but not necessarily, the present joint also includes a lower shim element having, as in the case of the upper shim element, a vertical portion lying between the rail web and the splice bar, and a lateral portion interposed between the rail flanges and the base of the splice bar. In this connection, and assuming the use of a lower shim element in conjunction with the upper shim element, another object of the invention is to so shape and form the lower shim element as to afford all necessary flexibility in the joint to permit the wave motion of the rails to pass readily therethrough, and to avoid torsion in the splice bar due to tightening of the joint bolts.

With the foregoing and other objects in view, which will become more fully apparent as the nature of the invention is better understood, the same consists in the novel features of construction of the shim or shims, and in their novel combination with the rails and the splice bar, as will be hereinafter more fully described, illustrated in the accompanying drawings and defined in the appended claims.

In the drawings, wherein are illustrated different practical embodiments of the invention, and wherein like characters of reference denote corresponding parts in related views:—

Figure 11 is a view similar to Figs. 1 and 6 illustrating another practical embodiment of the invention.

Figure 12 is a view similar to Figs. 2 and 7 of the joint shown in Fig. 11.

Figure 13 is a view similar to Figs. 3 and 8 of the joint shown in Fig. 11; and

Figures 14 and 15 are transverse sections on the lines 14—14 and 15—15, respectively, of Fig. 11.

Figure 1:
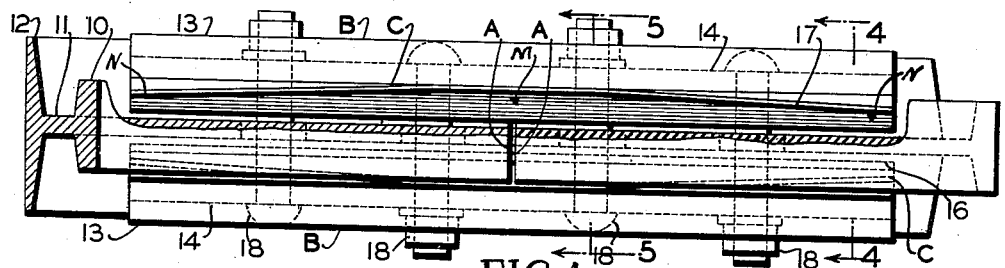
Figure 1 is a top plan view, with parts broken away, of a rail joint shimmed in accordance with one practical embodiment of the invention.
Figure 2:
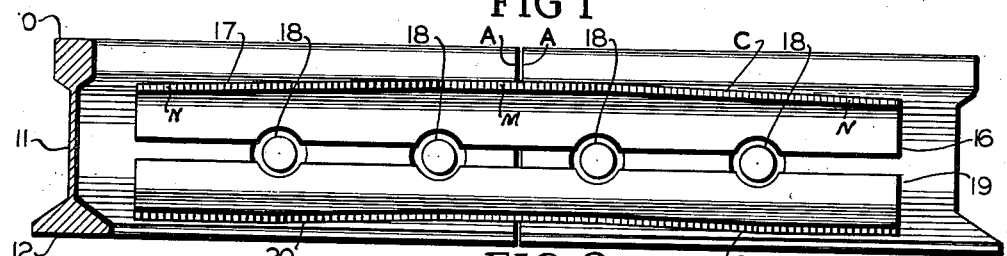
Figure 2 is a side elevation of the joint of Fig. 1, with the joint bar removed.
Figure 3:
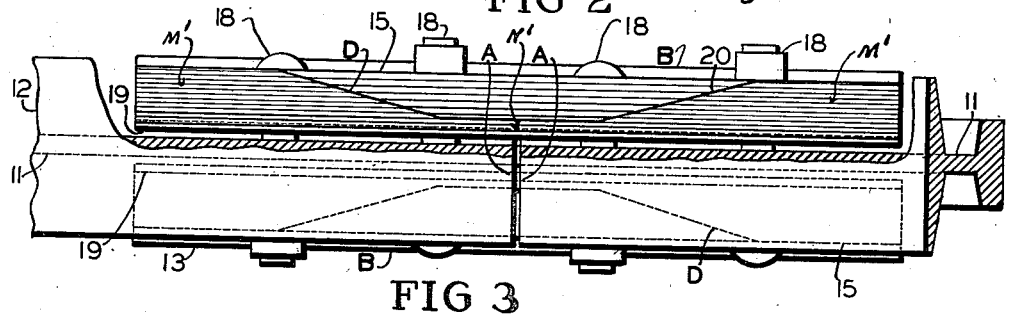
Figure 3 is a bottom plan view, with parts broken away, of the joint shown in Figs. 1 and 2.
Figure 4:
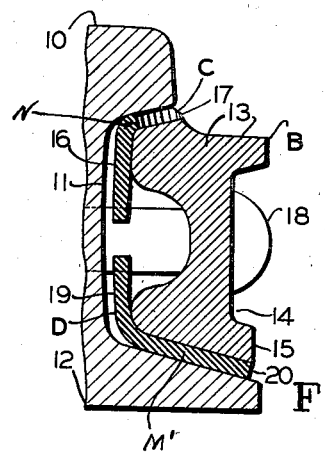
Figure 4 is a transverse section on the line 4—4 of Fig. 1.
Figure 5:
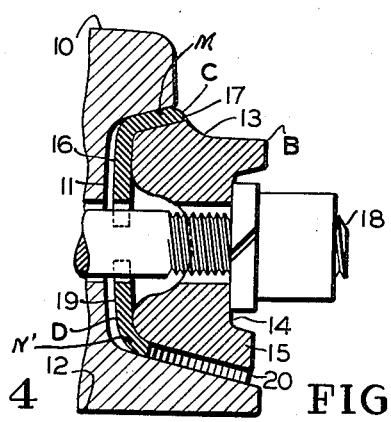
Figure 5 is a transverse section on the line 5—5 of Fig. 1.

Referring to the drawings in detail, first with particular reference to the form of the invention illustrated in Figs. 1 to 5, A, A, designate the meeting end portions of a pair of rails, B designates, generally, an associated splice bar, C designates, generally, an upper shim element interposed between the heads of the rails and the head of the splice bar, and D designates, generally, a lower shim element interposed between the bases of the rails and the base of the splice bar. The rails are of well known design and each includes, as usual, a head 10, a web 11 and a base 12. Similarly, the splice bar is, or may be, of any well known or suitable design and includes, as usual, a head 13, a web 14 and a base 15.

The upper shim C preferably corresponds in length to the length of the splice bar and is of uniform thickness throughout, being readily capable, therefore, of production from flat or sheet stock. It comprises a vertical portion 16 interposed between the webs of the rails and the splice bar, and a lateral stress-loading portion 17 interposed between the under sides of the rail heads and the top of the splice bar. As shown, the vertical portion 16 extends downwardly below the plane of the tops of the joint bolts 18 and is preferably notched to accommodate said bolts whereby the shim is held against longitudinal displacement. Also, as shown, the lateral portion 17 is of maximum width M, at the middle of the joint and progressively decreases in width towards the ends of the shim to a narrowing end bearing portion N. The portion M of maximum width substantially corresponds in width to the width of the fishing surface at the top of the splice bar, and in length substantially corresponds to the length of the area of maximum joint wear which, in practice, usually extends for a distance between two and four inches inwardly from the end of each rail. Thus, a relatively wide load-sustaining and wear resisting bearing area of metal is interposed between the head fishing surfaces of the rails and the splice bar where maximum wear occurs, while towards the ends of the joint the bearing area of metal between said fishing surfaces is gradually and progressively decreased until it vanishes, or substantially vanishes, at the extreme ends of the joint where very little or no wear occurs. Consequently, instead of wear being concentrated at the middle of the joint as heretofore, it is distributed substantially uniformly throughout the length of the joint and the joint therefore possesses long life. Moreover, because of the peculiar shape of the shim C especially the lateral portion 17 thereof, it is apparent that as wear takes place towards the ends as well as at the middle of the joint, the ends of the joint are permitted to be drawn inwardly and thereby facilitate inward drawing of the middle portion of the joint to compensate for wear, and maintain a tight joint.

The lower shim element D which, as aforesaid, may or may not be used in conjunction with the upper shim C, is, as in the case of the upper shim, of uniform thickness throughout and comprises a vertical portion 19 interposed between the webs of the rails and the splice bar, and a lateral portion 20 interposed between the upper faces of the rail flanges and the bottom face of the splice bar. The vertical portion 19 extends upwardly above the plane of the bottom faces of the joint bolts and is preferably notched to accommodate said bolts, whereby the shim is held against longitudinal displacement. On the other hand, the lateral portion 20 is of maximum width M' at its ends and of decreasing width to a middle narrowed bearing portion N' for the reason that usually at the base of the joint little or no wear occurs medially and most wear takes place at the ends thereof. Thus, greater bearing areas are afforded at the ends of the base of the joint where wear is most pronounced and from each end inwardly the bearing area is gradually decreased so that the portion 20, throughout its length, is subjected to substantially uniform wear, thus again contributing to longevity of the joint. Moreover, because of the peculiar shape of the portion 20 affording a certain amount of vertical flexibility in the joint, the wave motion of the rails is permitted to pass substantially uninterruptly through the joint. Preferably, but not necessarily, the end portions of the part 20 of the shim D correspond in width to the width of the base fishing surface of the splice bar, and from said end portions inwardy the width of the part 20 is gradually decreased until it vanishes, or substantially vanishes, in line with the ends of the medial portion of the joint which is subjected to maximum wear.

The shims C and D may be normally straight or they may, if desired, have a normal camber or outward bowing of their ends so that when their end portions are drawn inwardly, energy is stored therein tending constantly to urge their medial portions inwardly to a constant fit, and to compensate for any wear which may take place.

Figure 6:
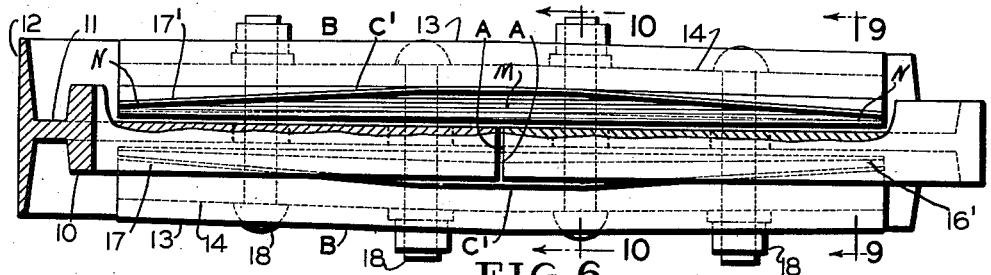
Figure 6 is a view similar to Fig. 1 illustrating another practical embodiment of the invention.
Figure 7:
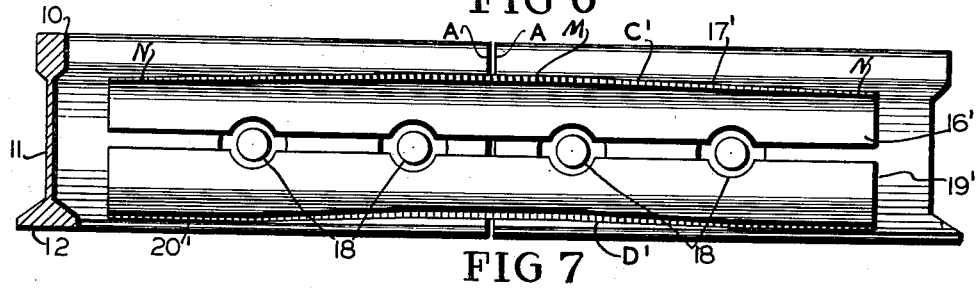
Figure 7 is a view similar to Fig. 2 of the joint shown in Fig. 6.
Figure 8:
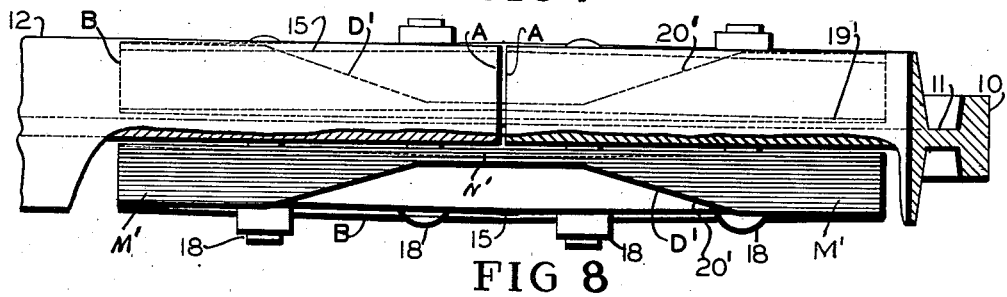
Figure 8 is a view similar to Fig. 3 of the joint shown in Fig. 6.
Figures 9, 10:
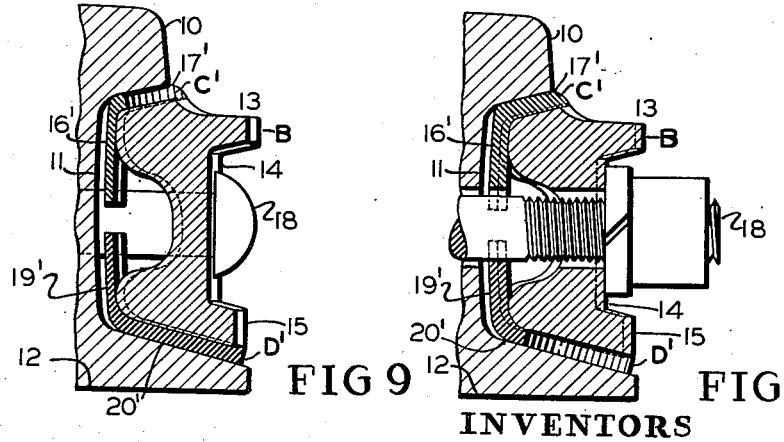
Figure 9 is a transverse section on the line 9—9 of Fig. 6.
Figure 10 is a transverse section on the line 10—10 of Fig. 6.

Referring to the embodiment of the invention illustrated in Figs. 5 to 10, it will be observed that the joint is, in all respects, a duplicate of the joint illustrated in Figs. 1 to 5 except that the shims C', D', instead of being of uniform thickness, have both their vertical portions 16', 19', respectively, and their lateral portions 17', 20', respectively, tapered or of outwardly diminishing thickness from their medial portions of greatest width to their ends. These shims C', D' may be normally straight or they may be cambered with their ends bowed normally outwardly. In either form, because of the reduced thickness of said shims toward their ends, especially the reduced thickness of the lateral portions 17', 20', respectively, it is apparent that, during installation and tightening of the joint, the middle of the joint first becomes tight while the ends of the joint are still loose and capable of further inward movement. Consequently, upon continued tightening of the outer joint bolts the splice bar and the shims are bowed inwardly at their ends and thereby the joint is energized so that thereafter the constant tendency of the medial portion of the joint is to move inwardly to automatically compensate for any wear which takes place. In this connection it is pointed out that, as illustrated, the shims C', D' preferably are of equal thickness where any plane transverse to the joint passes through them and that, in any event, each shim is tapered in thickness toward its ends the same amount as the other shim whereby, when the joint is tightened, any tendency of the end portions of the joint to be deflected either upwardly relative to the medial portion thereof is avoided with consequent avoidance of the setting up of torsional strains in the joint.

Referring to the Figures 11 to 15 embodiment of the invention, it will be observed that the joint is substantially the same as the joint illustrated in Figs. 6 to 10, except that the medially located upper shim element $C^2$ is of relatively short length and corresponds in length substantially to the length of the medial area of maximum wear of the joint, and that the lower shim is composed of two separate sections $D^2$, $D^2$ of relatively short length disposed at or near the ends of the joint. In other words, the shim elements, $C^2$, $D^2$, $D^2$ are of outwardly tapering thickness as in the case of the shim elements $C'$, $D'$, and thereby practically the same joint is or may be produced utilizing said short shims $C^2$, $D^2$, $D^2$ as is produced when the continuous shims $C'$, $D'$ are utilized.

It will be observed with respect to Figs. 1 to 10 embodiments of the invention that the vertical portions 16, 19 respectively, of the upper and lower shims are preferably spaced from the rail webs to permit the medial portions of the joints to be drawn inwardly to compensate for wear. Figs. 14 and 15 illustrate, however, that that the vertical portion $16^a$ of the shim $C^2$ is of a width to fit closely between the rail webs and the inner face of the head of the splice bar when the joint is tight, and further illustrate that the rounded connecting portion $c$ between the vertical and lateral portions $17^b$ of said shim $C^2$ has load sustaining bearing engagement both with the inner, upper corner of the splice bar and the head fillets of the rail, whereby wear is correspondingly reduced.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

We claim:—

1. A rail joint including the rails, the splice bar, an upper shim element including a lateral portion interposed between the under sides of the rail heads and the top of the splice bar, said lateral portion being of maximum width medially and of decreasing width toward its ends, and a lower shim element including a lateral portion interposed between the upper faces of the rail flanges and the bottom face of the splice bar, the said lateral portion of said lower shim being of maximum width at its ends and of decreasing width toward its middle.

2. A rail joint including the rails, the splice bar, an upper shim element including a lateral portion interposed between the under sides of the rail heads and the top of the splice bar, said lateral portion being of maximum width and thickness medially and of decreasing width and thickness toward its ends, and a lower shim element including a lateral portion interposed between the upper faces of the rail flanges and the bottom face of the splice bar, said lateral portion of said lower shim being of maximum thickness and least width medially and of decreasing thickness and increasing width toward its ends.

3. A rail joint including, in combination, the rails, the splice bar, an upper shim element interposed between the top of the splice bar and the under sides of the heads of the rails and having a full fishing bearing at the medial portion of the joint, and a lower shim element interposed between the foot of the bar and the upper sides of the rail flanges and having a narrowed fishing bearing medially of the joint, said shims and the fishing bearings thereof extending substantially throughout the length of the joint.

4. In a rail joint, the combination with the rails and splice bar, of a head fishing shim overlying the head of the bar, and a base fishing shim underlying the foot of the bar, said base fishing shim being substantially coextensive in length with the joint and having approximately full fishing width at its ends and less-than-full fishing width at its medial portion.

5. In a rail joint, the rails, the splice bar, and a shim element interposed between the upper faces of the rail flanges and the bottom face of the splice bar, said shim being of maximum width at its ends and of decreasing width toward its middle.

6. In a rail joint, the rails, the splice bar, and a shim element interposed between the upper faces of the rail flanges and the bottom face of the splice bar, said shim being of maximum width and least thickness at its ends and of decreasing width and increasing thickness toward its middle.

7. A rail joint including in combination with the rails, a splice bar having the central portion of its foot inward from the outer edge of the rail flange clear of the latter, shim elements beneath the end portions of the foot of the splice bar, and an upper shim element interposed between the top of the splice bar and the under sides of the rail heads, said upper shim element being of maximum width at its central portion under the rail ends and of progressively decreasing width toward its ends.

8. A rail joint including in combination with the rails, a splice bar having the central portion of its foot and the end portions of its head clear of contact with the rail, an upper shim element of maximum width at its central portion and of progressively decreasing width toward its ends, and a lower shim element of maximum width at its ends and progressively decreasing width toward the center of the joint.

CHARLES W. BREED.
GEORGE R. BURKHARDT.